(12) United States Patent
Agostinelli

(10) Patent No.: US 6,383,549 B1
(45) Date of Patent: May 7, 2002

(54) DRIED FOOD PRODUCT AND A PROCESS FOR PRODUCING THE PRODUCT

(76) Inventor: Antonio Agostinelli, 108 3rd Avenue, Edenvale (ZA)

(*) Notice: Subject to any disclaimer, the term of this patent is extended or adjusted under 35 U.S.C. 154(b) by 0 days.

(21) Appl. No.: 09/511,083

(22) Filed: Feb. 23, 2000

(51) Int. Cl.[7] .................................................. A23L 1/31
(52) U.S. Cl. ........................ 426/646; 426/105; 426/513; 426/518; 426/524
(58) Field of Search .................................. 426/105, 646, 426/513, 518, 524

(56) References Cited

U.S. PATENT DOCUMENTS

| | | | |
|---|---|---|---|
| H35 H | * 3/1986 | Berkowitz | 426/135 |
| 3,329,510 A | * 7/1967 | Paynter | 426/634 |
| 3,634,102 A | * 1/1972 | Paynter | 426/634 |
| 4,239,785 A | * 12/1980 | Roth | 426/266 |
| 4,868,002 A | * 9/1989 | Scaglione et al. | 426/641 |
| H70 H | * 6/1986 | Berkowitz | 426/385 |

FOREIGN PATENT DOCUMENTS

| | | | |
|---|---|---|---|
| JP | 401132345 | * 5/1989 | |
| ZA | 7405986 A | * 10/1975 | |
| ZA | 992995 | 8/1999 | |

\* cited by examiner

*Primary Examiner*—Nina Bhat
(74) *Attorney, Agent, or Firm*—Jenkens & Gilchrist, A Professional Corporation

(57) ABSTRACT

This invention relates to a food snack comprising light, crispy wafers of dried minced food, typically dried minced meat and a process for making the food snack. The process includes the steps of dicing and mincing the food, feeding the food into a sausage casing, freezing the food in the casing, cutting the food into slices and drying the slices.

17 Claims, 1 Drawing Sheet

DRIED FOOD PRODUCT AND A PROCESS FOR PRODUCING THE PRODUCT

BACKGROUND OF THE INVENTION

This invention relates to a process for preparing a dried food product and to a dried food product prepared by the process.

Dried meat snacks such as biltong (sometimes referred to as "jerky") and dried boerewors (dried sausage) are were known and very popular food products in South Africa. Biltong is produced by curing and drying slabs of beef or game meat. The curing process usually involves treating the meat slabs with vinegar, salt and a variety of herbs and spices while the drying process entails hanging the cured meat in a warm dry place for a number of days. Once cured and dried the biltong is either sold in the form of a slab, with the purchase slicing strips of the meat off himself, or is presliced. Biltong is generally fairly lean in composition, having a low fat content. The problem with biltong is that it is often tough to slice and to eat.

Dried boerewors on the other hand is formed by drying out sausage meat known in South African as boerewors. This is formed by stuffing minced meat into sausage casings and allowing this minced meat to dry. The dried boerewors can be flavoured with a variety of herbs or spices, and is available in stick form.

It is an object of this invention to provide a process of producing a new dried food product, in particular a new dried meat product.

SUMMARY OF THE INVENTION

According to the invention there is provided a process for producing a dried food product, the process including dicing and mincing a food type, feeding the food type into a sausage casing, freezing the encased food type in the casing, cutting the frozen food type into slices and drying the slices.

Typically, the encased food type is frozen to a core temperature between −5° C. and −10° C., preferably −8° C.

The casing in which the minced food product is housed is typically made from a plastics material, preferably PVC.

Preferably, the casing is removed from the frozen food type prior to cutting.

The frozen food type is preferably cut into slices having a thickness from 1 mm to 2 mm, preferably a thickness of 1,5 mm.

The slices are typically air dried under controlled conditions with an air temperature of between 35° C. and 50° C., preferably 45° C., and an air humidity of between 15% and 20%, preferably 18%.

Alternatively, the slices are air dried with the air at a temperature between 70° C. and 90° C., preferably 80° C., for 10 to 20 minutes and then air dried at a lower air temperature of between 35° C. and 50° C., preferably 45° C.

Advantageously, the humidity of the air is between 15% and 20%, preferably 18%.

The food type may be vegetable, fruit or meat or a combination of these food types. Typically, the food type is meat.

This invention extends to a food snack comprising light, crispy wafers of dried minced food, typically dried minced meat.

BRIEF DESCRIPTION OF THE DRAWING

A pictorial view of food snacks according to the invention.

DESCRIPTION OF AN EMBODIMENT OF THE INVENTION

Figure 1:
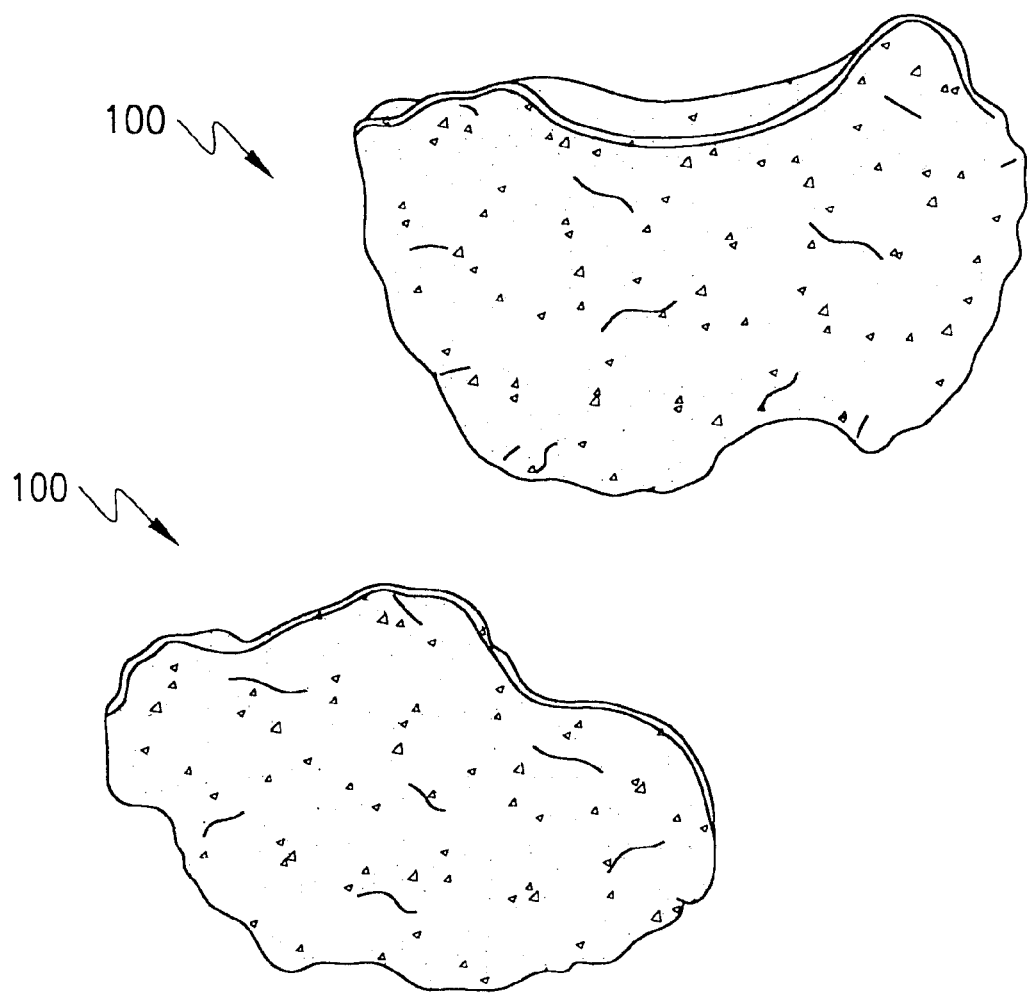

This embodiment of the invention is directed to a dried meat product. However other food types, such as vegetables and fruit or mixtures of meat, fruit and/or vegetables fall within the scope of the invention.

In a preferred embodiment of the invention, a process for producing a dried meat product includes obtaining lean beef, dicing the beef and mixing the diced meat with flavouring agents such as herbs and spices and preservatives. The mixture of diced meat and herbs and spices is minced and fed into PVC sausage casings under vacuum so that the meat mixture is packed firmly in the casing. A conventional vacuum sausage filling machine may be used for this purpose. Any type of tubular sausage casing can be used and the diameter of the casing will depend on the size of the snack that is required. Generally, a casing with a 50 mm internal diameter is used. The firmly packed encased meat mixture is then frozen at temperatures of between −5° C. and −10° C. Thereafter the casing is removed from the frozen meat mixture and the frozen meat mixture is cut into slices of less than 2 mm in thickness. Advantageously, the slices are cut to a thickness of about 1,5 mm in thickness. These slices are then dried to form a curled wafer (as shown in the drawing), that has a light crispy texture. If the slices are cut to a thickness of greater than 2 mm, the dried product has an undesirable "chewy" texture.

The slices are typically air dried under controlled conditions with an air temperature between 35° C. and 50° C., preferably 45° C., and an air humidity of between 15% and 20%, preferably 18%. The slices can be dried on racks or conveyors or tumble dried. Using this method, the drying process takes approximately 8 hours. In accordance with a preferred second drying method, the slices are dried in under 2 hours. The slices are first subjected to an air temperature of 80° C. for ten to twenty minutes and then the temperature is reduced to 45° C. until the slices have properly dried, i.e. until they have formed curled wafers that have a light crispy texture. During this drying process it is important to keep the humidity above 15%, preferably at 18%, to stop the slices from burning under the high temperatures.

EXAMPLE 50 kg of fresh beef is diced through a 13 mm plate. The dried beef is mixed with 2 kg of salt, herbs and spices, such as pepper, chilli and coriander and 2 liters of cold water and preservatives. The mixture is then diced and minced through a 4 mm plate. The mixture is then filled into a 50 mm diameter PVC sausage casing using a conventional vaccum, hydraulic or manual filling machine. The encased product is frozen to a core temperature of −8° C. using blast or vacuum freezing methods. Once the product has been frozen to this temperature, the casing is removed and the product is cut into disc-shaped slices 1,5 mm in thickness using an automatic slicing machine. The slices are then dried to form the light crispy meat product of the invention.

The slices may be dried on a rack or a conveyor or by tumble drying. In a first drying method, the slices are dried within 4–8 hours at a constant temperature of 35° C. and humidity of 18%. In a second drying method the slices are dried in under 2 hours. In this second method the slices are subjected to a temperature of 80° C. for 10 to 20 minutes. Thereafter the temperature is reduced to 45° C. for drying to take place in less than 2 hours. All the while the humidity is kept above 15%, preferably at 18%, to stop the slices from burning under the high temperatures.

I claim:

1. A process for producing a died food product, the process including dicing and mincing a food, feeding the food into a sausage casing, freezing the encased food in the casing, cutting the frozen food into slices not more than 2.0 mm thick and drying the slices, wherein the slices are air dried under controlled conditions with an air temperature of between 35° C. and 50° C., and an air humidity of between 15% and 20%.

2. A process according to claim 1 wherein the encased food product is frozen to a core temperature between −5° C. and −10° C.

3. A process according to claim 2 wherein the encased food product is frozen to a core temperature of −8° C.

4. A process according to claim 1 wherein the sausage casing is made from a plastics material.

5. A process according to claim 4 wherein the plastics material is PVC.

6. A process according to claim 1 wherein the sausage casing is removed from the frozen food product prior to cutting.

7. A process according to claim 1 wherein the frozen food product is cut into slices having a thickness from 1 mm to 2 mm, inclusive.

8. A process according to claim 7 wherein the frozen food product is cut into slices having a thickness of 1,5 mm.

9. A process according to claim 1 wherein the slices are air dried at an air temperature of 45° C.

10. A process according to claim 1 wherein the slices are air dried at an air humidity of 18%.

11. A process according to claim 1 wherein the slices are air dried with the air at a temperature between 70° C. and 90° C., for a period of 10 to 20 minutes and then air dried at a lower air temperature of between 35° C. and 50° C.

12. A process according to claim 11 wherein the slices are air dried at an air temperature of 80° C. for a period of 10 to 20 minutes and then air dried at a lower air temperature of 45° C.

13. A process according to claim 11 wherein the slices are air dried at an air humidity between 15% and 20%.

14. A process according to claim 12 wherein the slices are air dried at an air humidity of between 15% and 20%.

15. A process according to claim 1 wherein the food type is vegetable, fruit or meat or a combination of these food types.

16. A process according to claim 15 wherein the food product is meat.

17. A food product made according to the process of claim 1.

* * * * *